(12) United States Patent
Calo et al.

(10) Patent No.: US 7,941,478 B2
(45) Date of Patent: *May 10, 2011

(54) METHOD AND APPARATUS FOR DISTRIBUTED APPLICATION EXECUTION

(75) Inventors: Seraphin B. Calo, Cortlandt Manor, NY (US); Anees A. Shaikh, Yorktown Heights, NY (US); Renu Tewari, San Jose, CA (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/260,611

(22) Filed: Oct. 29, 2008

(65) Prior Publication Data

US 2009/0055274 A1 Feb. 26, 2009

Related U.S. Application Data

(63) Continuation of application No. 10/321,908, filed on Dec. 17, 2002, now Pat. No. 7,447,731.

(60) Provisional application No. 60/341,296, filed on Dec. 17, 2001.

(51) Int. Cl.
*G06F 13/00* (2006.01)
(52) U.S. Cl. ........ 709/201; 709/203; 705/37; 705/14.71
(58) Field of Classification Search ................. 709/201, 709/203, 232, 219; 705/37, 14.71, 14.39, 705/14.49, 14.51–14.56

See application file for complete search history.

(56) References Cited

U.S. PATENT DOCUMENTS

| 6,421,733 | B1 | 7/2002 | Tso et al. |
| 6,640,240 | B1 | 10/2003 | Hoffman et al. |
| 6,744,741 | B1 | 6/2004 | Ju et al. |
| 6,754,699 | B2 | 6/2004 | Swildens et al. |
| 6,757,740 | B1 | 6/2004 | Parekh et al. |
| 6,879,808 | B1 | 4/2005 | Nations et al. |
| 6,959,318 | B1 * | 10/2005 | Tso ............................... 709/203 |
| 7,447,731 | B2 * | 11/2008 | Calo et al. ..................... 709/201 |
| 2002/0161767 | A1 | 10/2002 | Shapiro et al. |

OTHER PUBLICATIONS

Brooks, Charles et al., Application-Specific Proxy Servers as HTTP Stream Transducers, World Wide Web Journal, Issue One Conference Proceedings, Fourth International World Wide Web Conference, Nov. 1995, First Edition.

* cited by examiner

*Primary Examiner* — Kenneth R Coulter
(74) *Attorney, Agent, or Firm* — Scully, Scott, Murphy & Presser, P.C.; Gail H. Zarick, Esq.

(57) ABSTRACT

This invention provides methods and apparatus for executing applications in a distributed manner employing one or more proxy servers and one origin server. The invention allows the applications to be executed primarily at the proxy servers rather than at the origin servers, thereby gaining in scalability and improved user response time. A redirection mechanism is used to direct requests to one of the proxy servers. The proxy server uses caching techniques to bring information records needed for application execution to the proxy servers. The code required for application execution is also obtained from the origin server. The invention discusses applying this technique to three Web-based applications, namely Web-based auctions, generating personalized content for Web-users, and creating advertisements for users accessing a Web page.

14 Claims, 17 Drawing Sheets

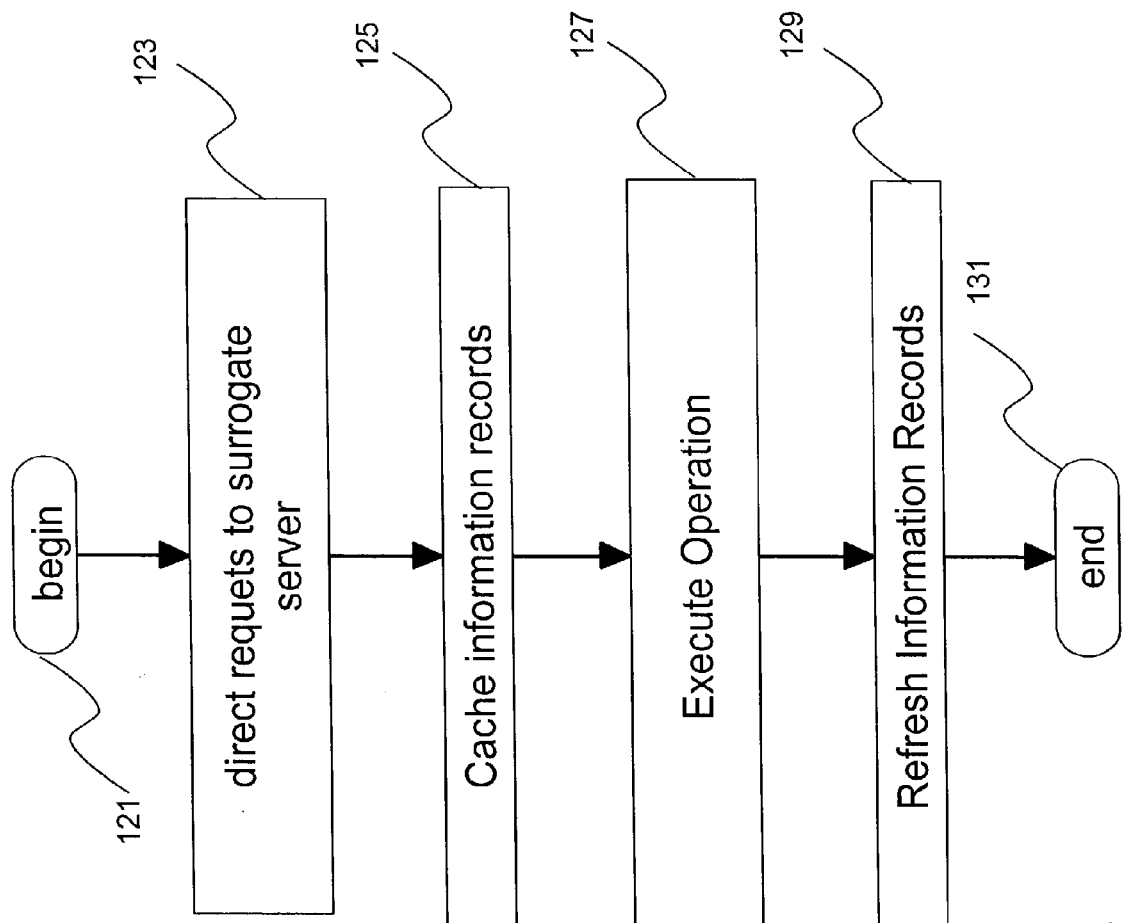

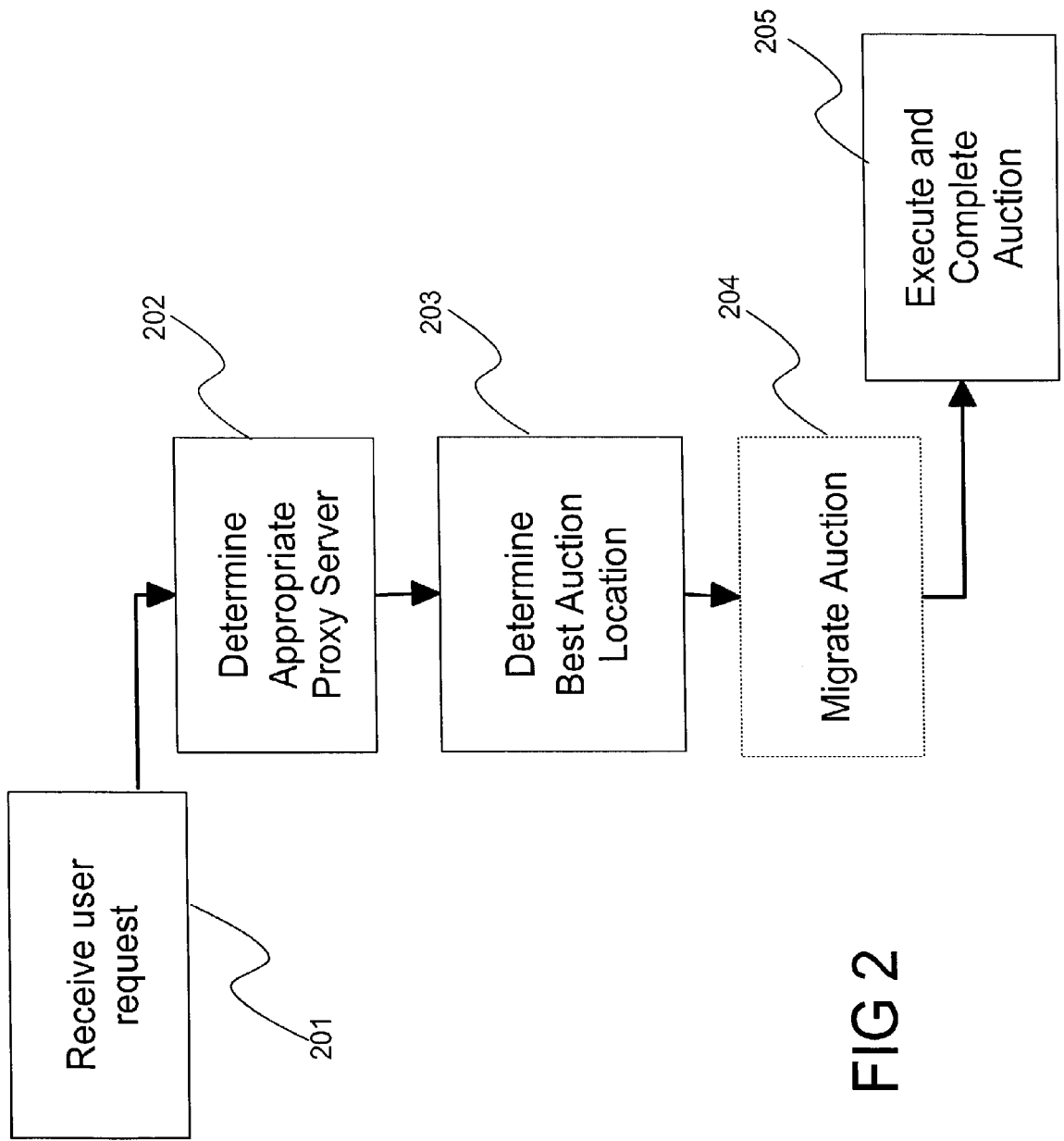

METHOD AND APPARATUS FOR DISTRIBUTED APPLICATION EXECUTION

CROSS-REFERENCE TO RELATED APPLICATIONS

This application is a continuation of U.S. Ser. No. 10/321,908, filed on Dec. 17, 2002, U.S. Pat. No. 7,447,731 issued on Nov. 4, 2008, the entire contents of which are incorporated herein by reference.

PRIORITY

This application claims priority to Provisional application entitled "Method and Apparatus for Distributed Application Execution", filed Dec. 17, 2001, assigned Ser. No. 60/341,296.

FIELD OF THE INVENTION

The present application relates to the field of computer networks and distributed applications. It is more particularly directed to applications made available on the Internet using a system of Web-browsers and Web-servers.

BACKGROUND OF THE INVENTION

Access over the Internet to Web-based applications is provided by having a Web-browser connect directly over a network of routers to a central Web server that executes the applications. The applications generate text formatted in HTML syntax that can be parsed and displayed by the Web-browser. Examples of some applications that are made available on the Web include Web-based auctions and Web-based store fronts.

However, during periods of congestion due to traffic patterns on the Internet, this arrangement results in poor response times for the end user. The situation is typically worsened when a user or a set of users is located far from the central Web server. As an example, in a Web-based auction, the requesters for a specific item may be located at a site that is far away from the central Web server. Such a situation arises, for example, if the item being sold has some relevance to a geographic region or locality. A requester is defined as a user who seeks information about an auction item or who actually participates in an auction. For a more specific example, consider the auction of a baseball bat that was used in a record setting high school match between two towns in California. It is to be expected that most requesters for this item would be in California. However, if the central Web site is located in New York, the performance perceived by the clients would be adversely impacted whenever the network between California and New York was congested. Executing the auction at a site in California would increase the performance of the application as perceived by its users.

One way to improve the response time, reliability, and availability of the application would thus be to distribute the auction to proxy servers located closer to the bidders. Here the term "proxy server" refers to one of a set of distributed Web servers that can provide the same service as the main central Web server, and that are in communication with it. This is in contrast to client proxies that act on behalf of requesters.

The current state of the art allows such distributed Web servers to provide access to static content, such as images or video files. However, such distribution is not usually possible for applications that are accessed over the Web. In this invention, we describe a scheme that can allow Web-based applications to benefit from such geographic distribution. Specifically, we look at applications that can provide Web-based auctions, generation of personalized content, and generation of advertisements that are incorporated in Web pages.

SUMMARY OF THE INVENTION

Accordingly, an aspect of the present invention is to provide methods and apparatus by which to distribute and accelerate execution of Web-based applications by means of executing them at proxies located closer to requesters.

Another aspect of the present invention provides an apparatus of a proxy server that provides an execution environment and maintains the required state for Web-based applications.

Another aspect of the present invention provides an apparatus of a main server that provides an execution environment and maintains the required state for Web-based applications.

Another aspect of the present invention provides methods and apparatus by which to distribute and accelerate execution of Web-based auctions by means of executing them at proxies located closer to requesters.

Another aspect of the present invention provides an apparatus of a proxy server that provides an execution environment and maintains the required state for Web-based auctions.

Another aspect of the present invention provides an apparatus of a main server that provides an execution environment and maintains the required state for Web-based auctions.

Another aspect of the present invention provides methods and apparatus by which to distribute and accelerate execution of Web-based personalized content by means of generating it at proxies located closer to requesters.

Another aspect of the present invention provides an apparatus of a proxy server that provides an execution environment and maintains the required state for Web-based personalization of content.

Another aspect of the present invention provides an apparatus of a main server that provides an execution environment and maintains the required state for Web-based personalization of content.

Another aspect of the present invention provides methods and apparatus by which to distribute and accelerate execution of Web-based generation of advertisements by means of generating them at proxies located closer to requesters.

Another aspect of the present invention provides an apparatus of a proxy server that provides an execution environment and maintains the required state for Web-based generation of advertisements.

Another aspect of the present invention provides an apparatus of a main server that provides an execution environment and maintains the required state for Web-based generation of advertisements.

BRIEF DESCRIPTION OF THE DRAWINGS

These and other aspects, objects, features, and advantages of the present invention will become apparent upon further consideration of the following detailed description of the invention when read in conjunction with the drawing figures, in which:

FIG. 1A is an example of a block diagram that shows steps that comprise a method of distributing and accelerating applications;

FIG. 2 is an example of a block diagram that shows steps that comprise a method of distributing an auction for a particular item;

DETAILED DESCRIPTION OF THE INVENTION

This invention provides schemes whereby a Web-based auction may be executed by a set of distributed proxies, thus accelerating its operation while still maintaining administrative and operational control of the auction at the original central server.

Furthermore, in this invention, we provide a scheme whereby Web-based generation of personalized content may be executed by a set of distributed proxies, thus accelerating the personalization operation while still maintaining administrative and operational control at the original central server.

Furthermore, in this invention, we provide a scheme is provided whereby Web-based generation of advertisements may be executed by a set of distributed proxies, thus accelerating the operation of this application while still maintaining administrative and operational control of the generation of advertisements at the original central server. The present invention presents methods and apparatus to distribute and accelerate execution of Web-based applications by means of executing them at proxies located closer to requesters. It includes an apparatus of a proxy server that provides an execution environment and maintains the required state for Web-based applications; an apparatus of a main server that provides an execution environment and maintains the required state for Web-based applications; methods and apparatus by which to distribute and accelerate execution of Web-based auctions by means of executing them at proxies located closer to requesters; an apparatus of a proxy server that provides an execution environment and maintains the required state for Web-based auctions; an apparatus of a main server that provides an execution environment and maintains the required state for Web-based auctions; methods and apparatus by which to distribute and accelerate execution of. Web-based personalized content by means of generating it at proxies located closer to requesters; an apparatus of a proxy server that provides an execution environment and maintains the required state for Web-based personalization of content; an apparatus of a main server that provides an execution environment and maintains the required state for Web-based personalization of content; methods and apparatus by which to distribute and accelerate execution of Web-based generation of advertisements by means of generating them at proxies located closer to requesters; an apparatus of a proxy server that provides an execution environment and maintains the required state for Web-based generation of advertisements; an apparatus of a main server that provides an execution environment and maintains the required state for Web-based generation of advertisements.

Figure 1:
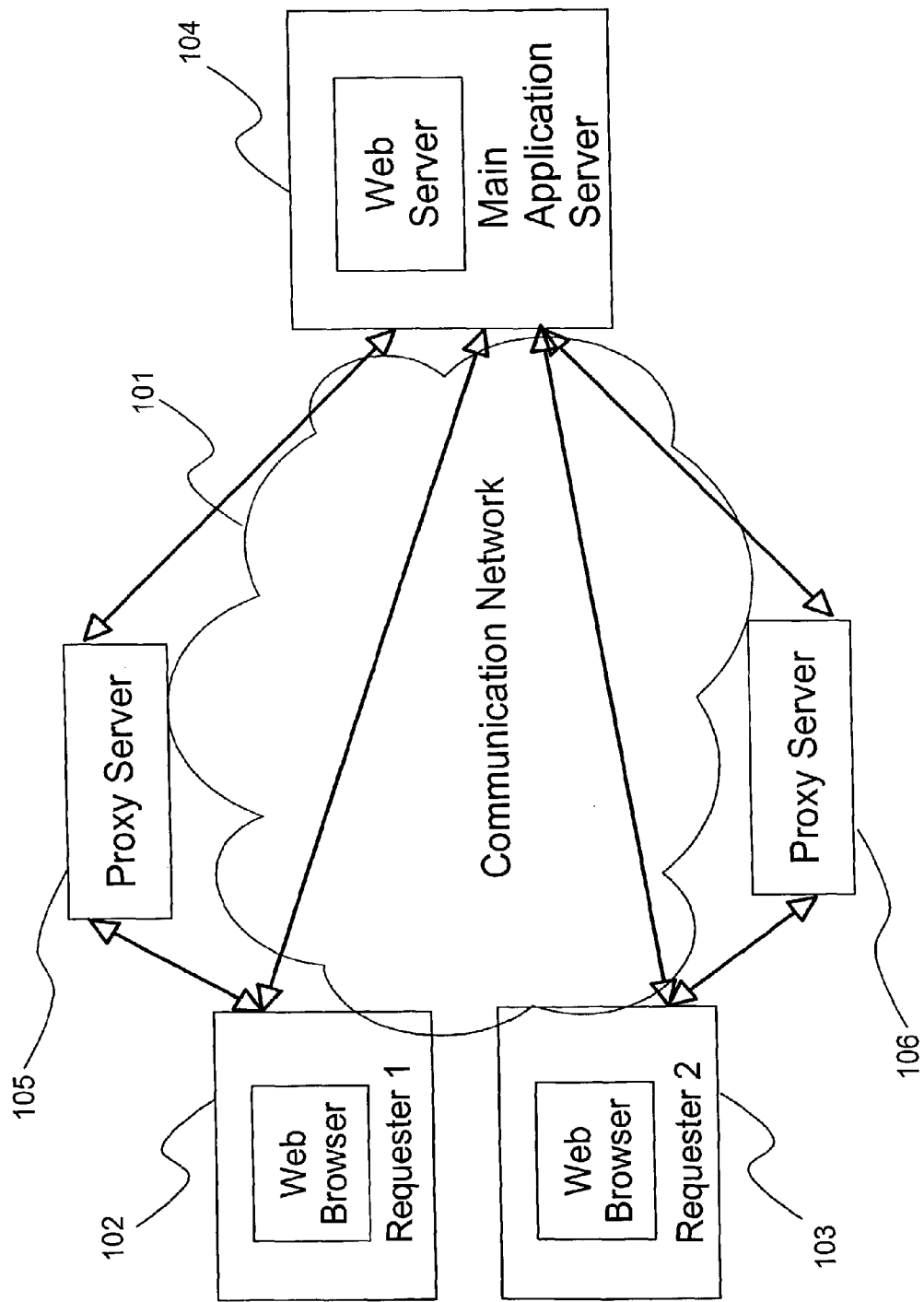
FIG. 1 is a block diagram that depicts an example of components of an application distribution and acceleration infrastructure, and their manner of interaction.

FIG. 1 shows components of an application distribution and acceleration infrastructure. A communication network 101 is used to interconnect client/user requester devices containing Web-browsers like 102 and 103 to a central server 104 that serves the Web-based auction. Major portions of the application code are replicated onto proxy servers like 105 and 106 that are in closer proximity to the respective requesters. Communication is maintained between the proxy servers 105 and 106 and the main server 104 so that the proxies can send results to the server and the main server can continue to exercise administrative control over the distributed portions of the application code. Communication is also maintained between the requesters 102 and 103 and the main server 104 so that the server can continue to perform application functions that are not readily distributable. Instances of applications distributed in this manner include auction applications, personalized content generation applications, and advertisement generation applications, among others.

The central server as described in FIG. 1, is also known by alternative names such as the main server or the origin server in the current state of the art. A proxy server is also known as a surrogate server in the current state of the art. A surrogate server is usually defined as a proxy server which is under the same administrative control as the main server, or that has some administrative arrangements with the administrator of the main server. In this disclosure, we will use proxy servers and surrogate servers interchangeably. Similarly, the terms clients and users are used interchangeably.

FIG. 1A illustrates an embodiment showing steps executed in order to distribute the application code. The flowchart is entered at the beginning, step 121, when a request is initiated by a client, e.g., by using a browser program to request a URL for the application. In the next step 123, the request is directed to one of the surrogate servers (or proxy servers) that are in the system. In step 125, the proxy server receiving the request caches a set of information records at its location. Caching is the operation of retrieving an information record as needed from the origin server. If an information record is already present at the proxy server, no requests are made to the origin server. However, if the information record is not present at the proxy server, or if the information record is out of date, the proxy server retrieves the information record from the origin server. The surrogate server then executes the operation in step 127 and returns the results to the client. In step 129, the proxy server may refresh some of the information records from the origin server. This step may be skipped if the proxy determines that there is no need for such a refreshing. Finally, the process terminates in step 131. Instances of applications that can be accelerated in this manner include auction applications, personalized content generation applications, and advertisement generation applications, among others.

FIG. 2 shows the steps that comprise an embodiment of a method of auction distribution. In response to a user service request 201, a server selection module determines the appropriate proxy server to which to direct the request as in 202. This decision is based upon the current location of the auction for the item of interest. After collecting information about the distribution of requesters, the proxy server or main server then determines the optimal location for the auction, as in 203. If the auction is not currently located at the optimal site, the auction is migrated as in 204. Once the auction is in its appropriate location, it is executed there until further migration is necessary. When the auction is over, results are logged at the proxy server, communicated to the main server, and returned to the requester. This step is in 205.

Figure 3:
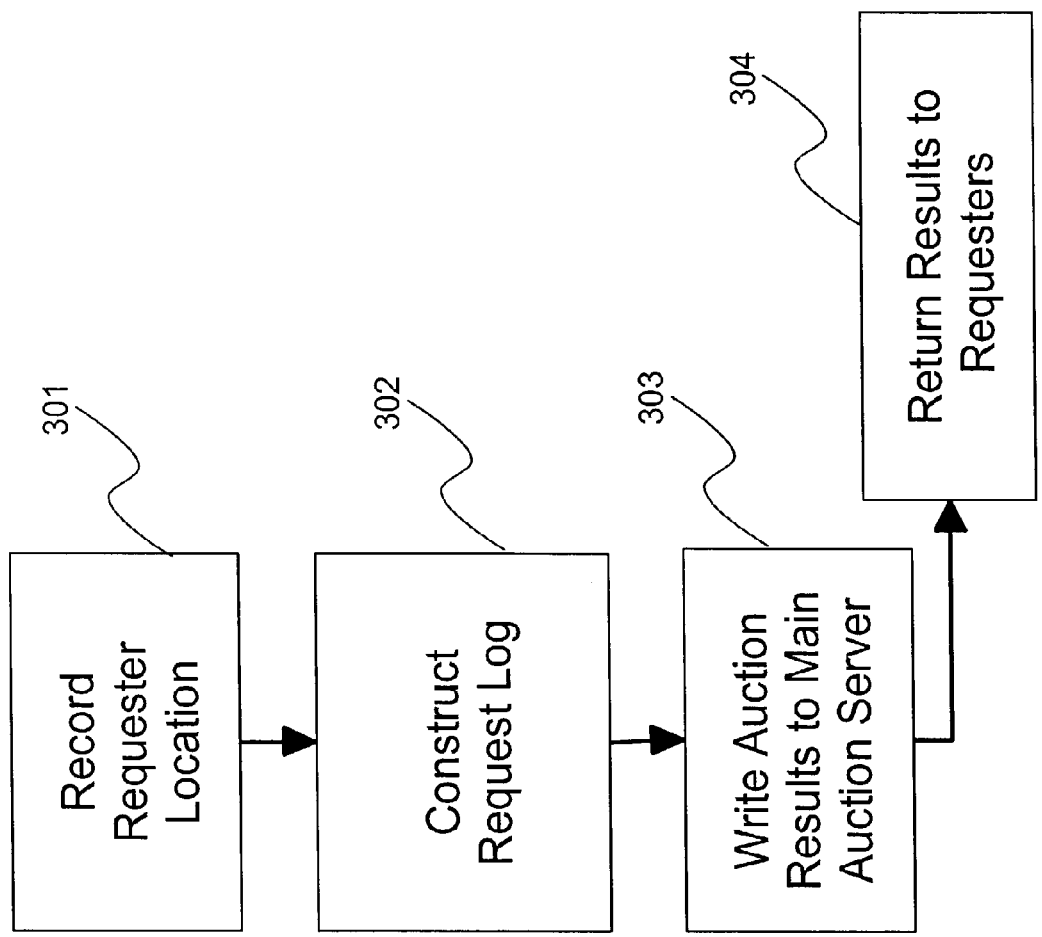
FIG. 3 is an example of a block diagram that shows steps taken by a proxy server in executing an auction in accordance with the present invention.

FIG. 3 is a block diagram of an invention embodiment that shows the steps taken by the proxy server in executing the auction for a particular item. The proxy server obtains and records information regarding the location of requesters for the item, as in 301. This information is used to determine when and where to migrate the auction if necessary. A request log is constructed, as in 302, which contains a timestamped record of at least some pertinent information for each request. Once the auction has closed, the request log and auction results are returned to the main server, as in 303. Finally, the auction results are returned to the interested requesters, as in 304. If the auction for an item is being conducted at the main server itself, then all of these steps would be executed at the main server.

Figure 4:
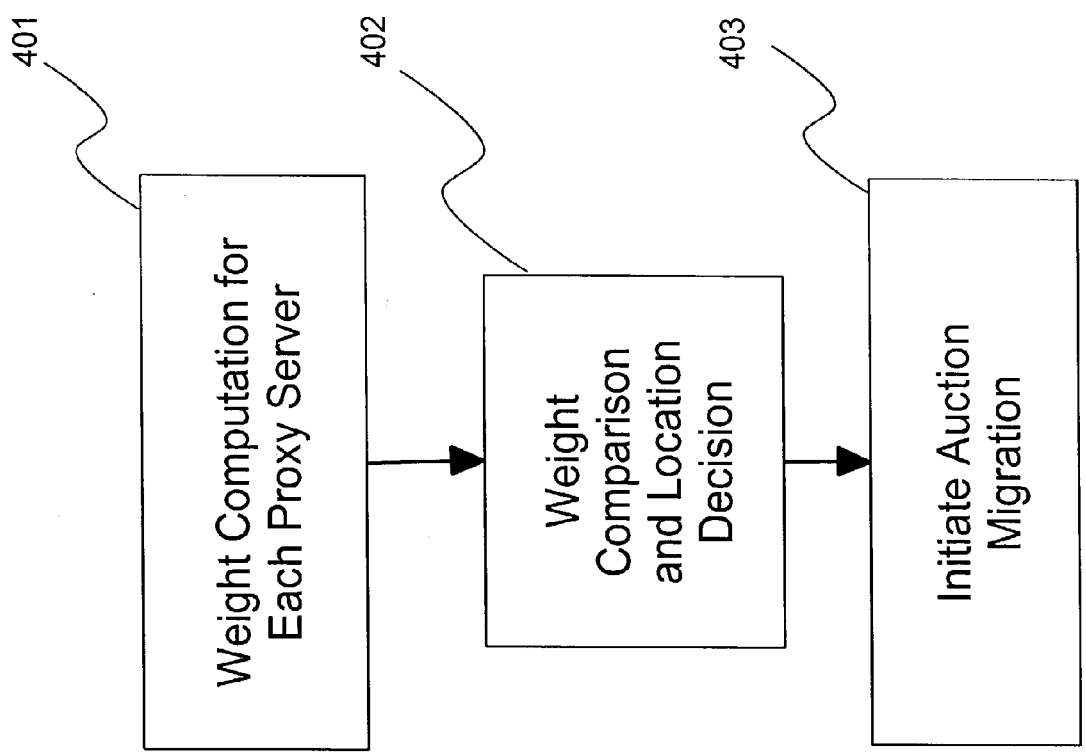
FIG. 4 is an example of a block diagram that shows the steps that comprise the determination of the appropriate proxy server for a particular auction item in accordance with the present invention, the overall invention.

FIG. 4 is a block diagram that shows the steps of an embodiment that include the determination of the appropriate location for an auction for a particular item. A migration weight is computed for each available proxy, as well as the main server, as in 401. The weight is based on the proximity of requesters for the item to each of the proxies. It may be additionally based on the relative load on the proxies and main server. Relative load is determined as the load on the proxy or main server machine, as compared to the load on all servers available to host the auction. To determine proximity, the network may be divided into predetermined zones, with the distance of each zone to each proxy and the main server precomputed. The zones could be based on geographic location or IP address ranges. The distance to a zone may be defined, for example, in terms of network latency between the proxy server and requesters in each zone, or in terms of the geographic proximity of a proxy server to a zone.

Periodically, or by some other predetermination criteria, the weights are re-computed and checked to determine which proxy has the highest weight, as in 402. The proxy server with the highest weight should be the one closest to the zone with the most requesters, and also having a relatively light load. Once the best proxy server is determined, the proxy or main server can initiate migration of the auction for the item, as in 403.

Figure 5:
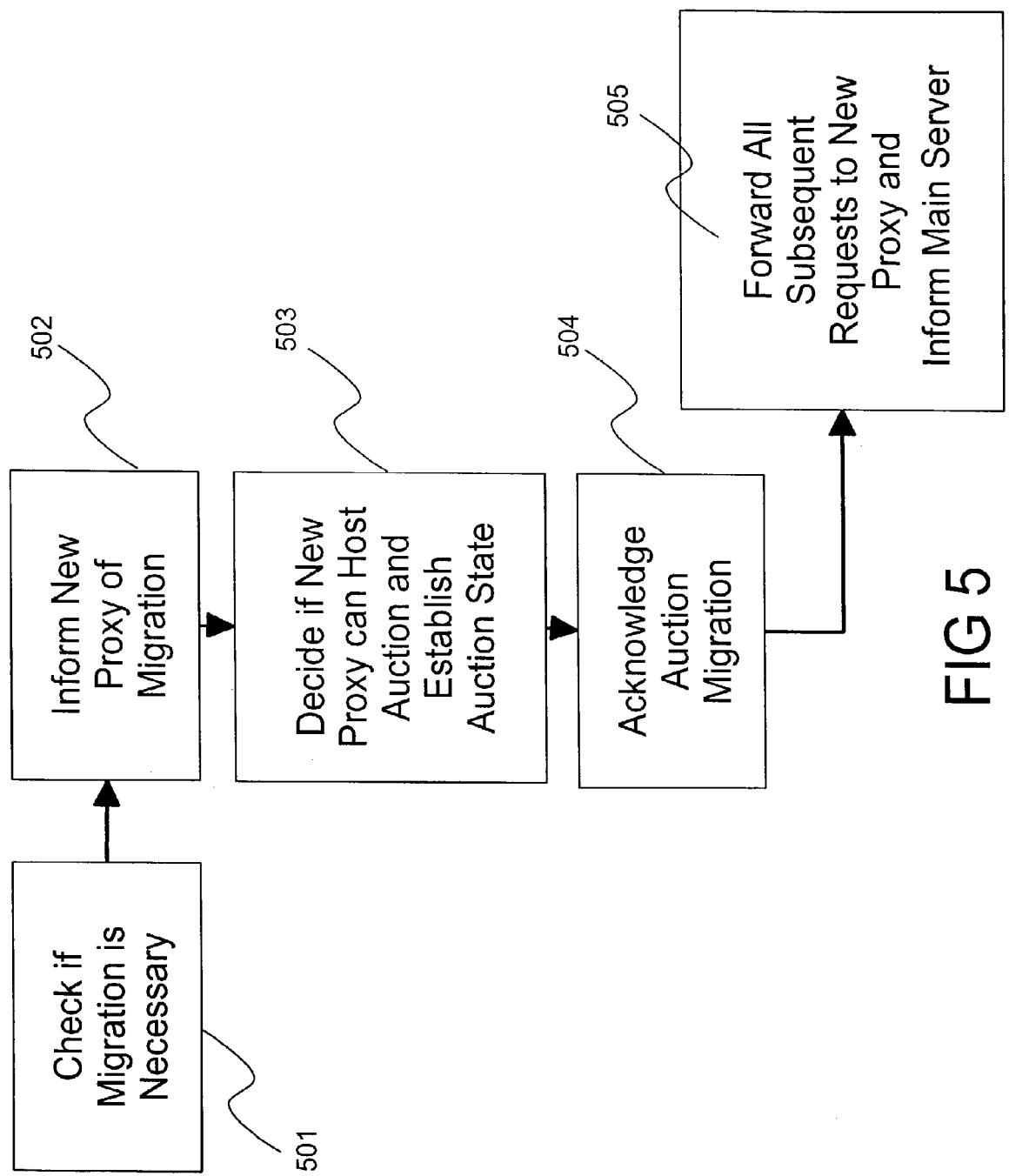
FIG. 5 is an example of a block diagram that shows steps needed to migrate an auction from one proxy server to another, or from the central auction server to a proxy server in accordance with the present invention.

FIG. 5 is a block diagram showing an embodiment of the steps to migrate an auction for an item to a new site. After the initial check of whether migration is necessary, as in 501, the current auction site (proxy or main server) sends a message to the new server informing it of the intent to migrate the auction, as in 502. The current site should include the auction state in the message to the new site. The auction state includes at least some pertinent information about the auction, including the item description, auction parameters, and the existing request log. At the new site, the proxy determines whether it can host the auction; and, if so, it establishes the auction state locally, as in 503. This step is taken in order to allow the new site to refuse the migration if, for example, it is overloaded. If the new site agrees to accept the migration, it sends a positive acknowledgement message to the original auction site, as in 504, indicating that it is ready to accept requests for the auction item. The original site then forwards any new requests it receives for the migrated auction to the new site and also informs the main server of the migration, as in 505. New requesters wanting to join the auction will be automatically directed to the correct site via the server selection module. Existing requesters who contact the original auction site will be referred to the new site. The referral can be accomplished using an HTTP redirect mechanism, for example.

Figure 6:
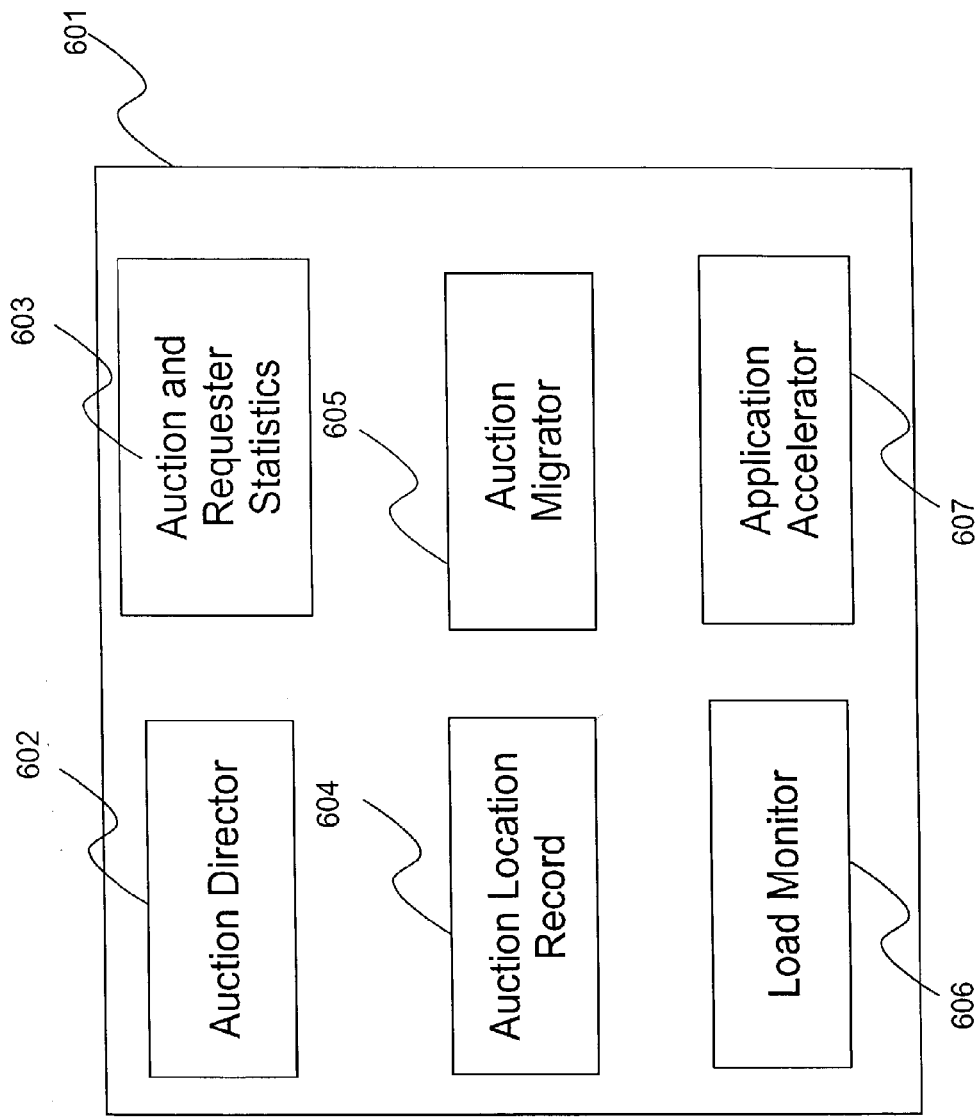
FIG. 6 is an example of a block diagram showing an example of the structure of a distributed system that implements the proposed solution to the distributed auction problem.

The schemes as described above can be seen as a system that achieves distribution of auction execution. An embodiment of an apparatus, 601, that implements a distributed auction system is shown in FIG. 6. FIG. 6 includes six components, an auction director, 602, a set of auction and requester statistics, 603, a record of auction item locations, 604, an auction migration module, 605, a server selection and load balancing module, 606, and an application acceleration module, 607.

The application acceleration module, 607, provides a general environment for distributing Web-based applications. It allows the proxy to automatically download the auction application program from the main server. Its function is distributed between the main auction server and the set of proxies. The details of such a module are available in a cofiled application titled "Method and Apparatus for Distributed Application Acceleration." This invention may, however, use alternate methods that provide a general environment for distributing Web-based applications.

The load monitor, 606, is a distributed module that resides on the main server and on each proxy server. It collects load statistics and shares the information with the other load monitors. The sharing can be done by multicasting to other proxies or by reporting statistics to a single instance of the module which serves as a centralized repository.

The auction director module, 602, consults the auction location record, 604, to determine where to direct requesters based on their item of interest. It may be implemented in a variety of manners. One way to implement it is by means of a module within the main server that is responsible for redirecting requests to the appropriate proxy server. Such a redirection module might be implemented as a plug-in module among a variety of Web-servers such as Apache, Netscape or Microsoft IIS servers, which are commonly in use in the industry. The module would consult a table of redirection rules that specify where requests for different auction items (e.g., as indicated by their URLs) should be directed, and use this information to direct the requester.

Another embodiment of the auction director could be via a stand-alone HTTP server that provides the same functionality as that of the module described above. The HTTP server directs requests to proxy servers, or to the main server, depending on the location of the auction item. The HTTP server must communicate with the auction location record to know the location of auction items.

The set of auction and bidder statistics, 603, provides a record of events in the auction, along with the location of requesters. A set of these statistics is maintained for each auction item. The auction statistics record at least each submitted request, including the requester's identity, request timestamps, and the highest bid received for each item. The requester location statistics keep track of where (i.e., in which zone) requesters are located. In an alternate embodiment, the collection of these statistics are simplified by dividing the network into zones to which users are statically mapped. Suppose a request B arrives for an auction item from zone Z. First B is recorded in the request log. In addition the count of requests from zone Z is incremented. Consulting these statistics should give an immediate view of the zone that is generating the most requests for the auction item.

The auction location record 604 keeps track of which machine (proxy or main server) is hosting the auction for each item. It serves as a directory for the auction director module, 602, to allow the director to determine where to send requesters for a particular auction item. The auction location record may be embodied as a centralized directory that is accessed and updated as requests arrive and auctions are migrated.

In a general embodiment of the present invention, the auction migrator, 605, is a distributed module that resides on each machine, i.e., proxies and the main server. The migrator periodically consults the requester statistics record, 603, and load monitor, 606, to determine if the current proxy is the best location for the auction for each particular item. If, for example, most of the requests for an item are coming from another zone, i.e., not the proxy's own zone, the migrator can initiate migration to the proxy in a zone closer to the requester population. The auction migrator implements the migration method described in FIG. 5.

Figure 7:
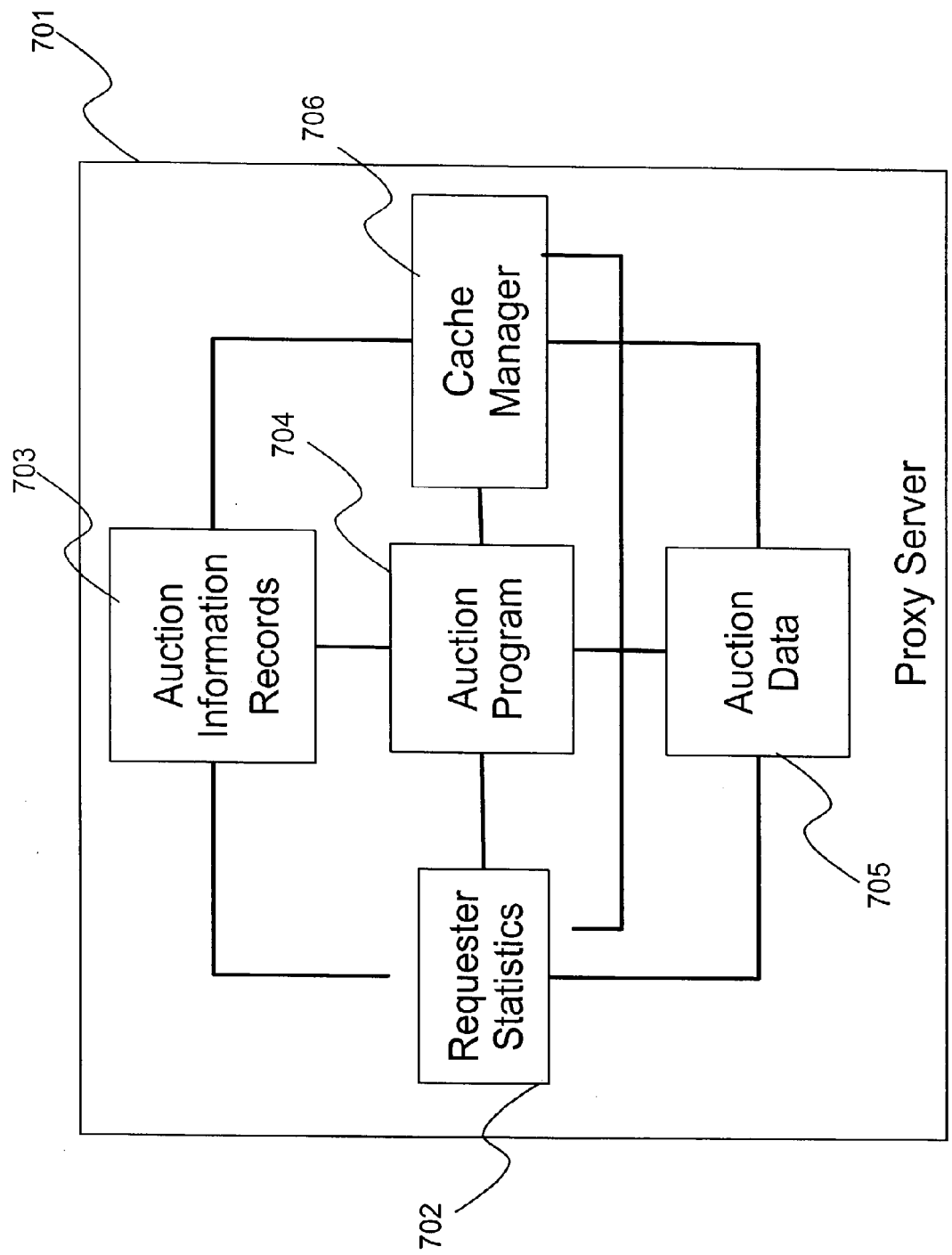
FIG. 7 is a block diagram showing an example of the structure of a proxy server, which is a component of a solution to the distributed auction problem.

The components of the distributed architecture shown in FIG. 6 are contained in various proxies and the main server. A proxy server which is such a component in this solution is shown in FIG. 7. The proxy server, 701, includes a set of requester statistics, 702, a set of cached 8 auction information records, 703, the cached auction 9 program, 704, the auction data and statistics, 705, and a cache manager, 706. The cache manager, 706, is responsible for managing and updating the different types of caches, namely the set of cached auction information records, 703, the cached auction program, 704, and the set of cached data, 705. The cache manager maintains all of these caches in an appropriate manner. The set of cached auction information records, 703, contains information about the auction items that are available locally. These records are updated by the cache manager as auctions are migrated to and from the proxy. The auction program, 704, is downloaded from the main server using the facilities provided by the application accelerator module (607 in FIG. 6). It executes the program logic necessary to execute the auction program locally at the proxy server. The auction data, 705, is the record of the auction progress, including the request log information. The set of requester statistics, 702, keep track of where requesters are coming from in order to facilitate auction migration.

Figure 8:
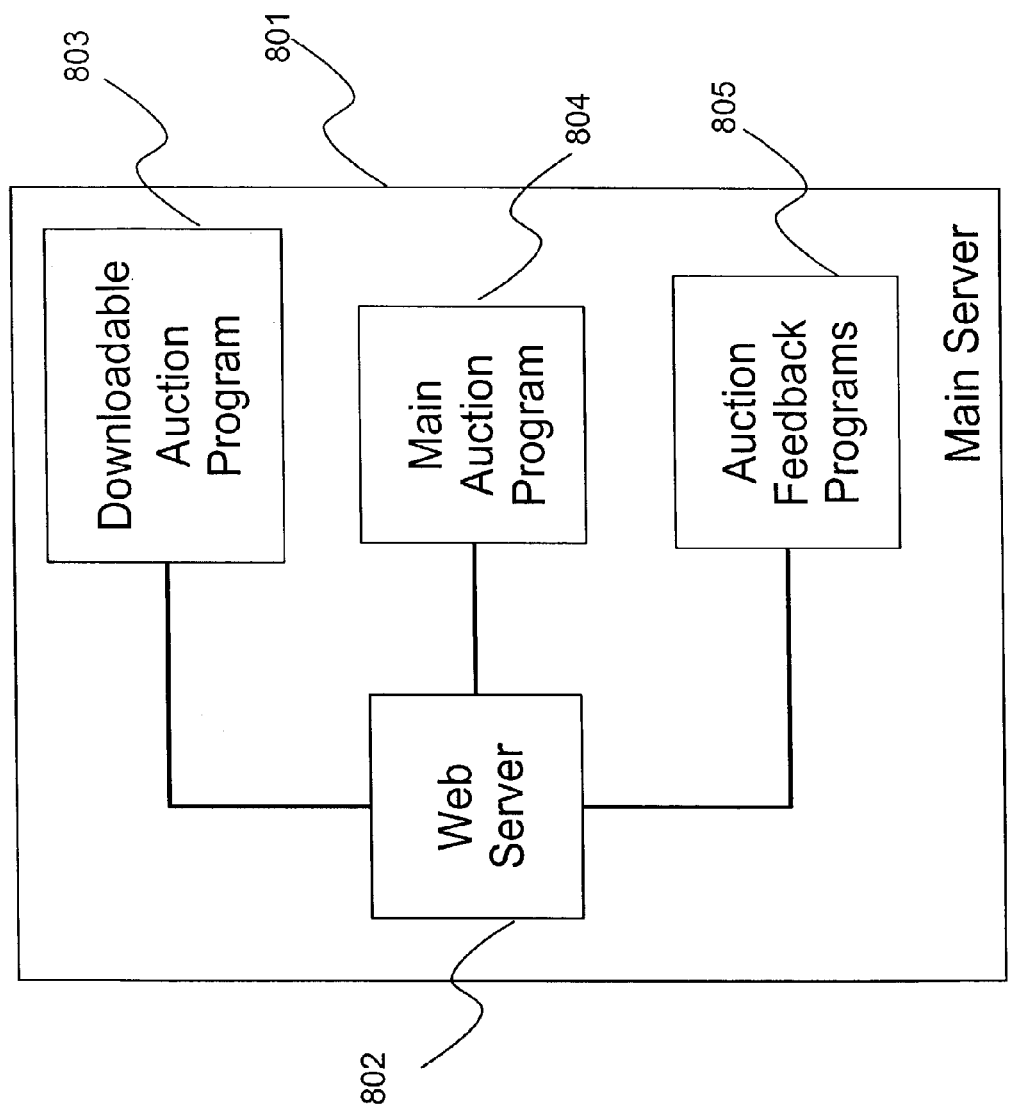
FIG. 8 is a block diagram showing an example of a structure of a main server, which is a component of a solution to the distributed auction problem in accordance with present invention.

FIG. 8 shows a structure of a main server which would respond to the proxy server shown in FIG. 7, and provides another part of the infrastructure for auction distribution. The main server, 801, includes a traditional web-server, 802, the auction programs to be downloaded to proxy servers, 803, a local main auction program, 804, and a set of feedback programs, 805. The web-server, 802, provides the means by which a proxy server can gain access to the set of programs 803, 804 and 805. The downloadable program, 803, is transferred to a proxy server upon request. The local program, 804, provides a means by which a proxy server can 9 execute some parts of the auction processing at the main server itself.

As an example, a proxy server may want to execute auction result notification only at the main server. The auction feedback program, 805, provides a means by which a proxy server can provide diagnostics and management information to the main server. An example of the feedback program, 805, would be a logger servlet that can obtain logging messages generated by the auction executing at the proxy server in order to recover from execution failures.

In some embodiments of the main server, the Web-server may incorporate an ability to redirect user requests to other servers. This would be an instance of the auction director module (602 in FIG. 6). The main server as described in FIG. 8 and a set of proxy servers as described in FIG. 7 together provide the infrastructure for distributed auction execution.

Figure 9:
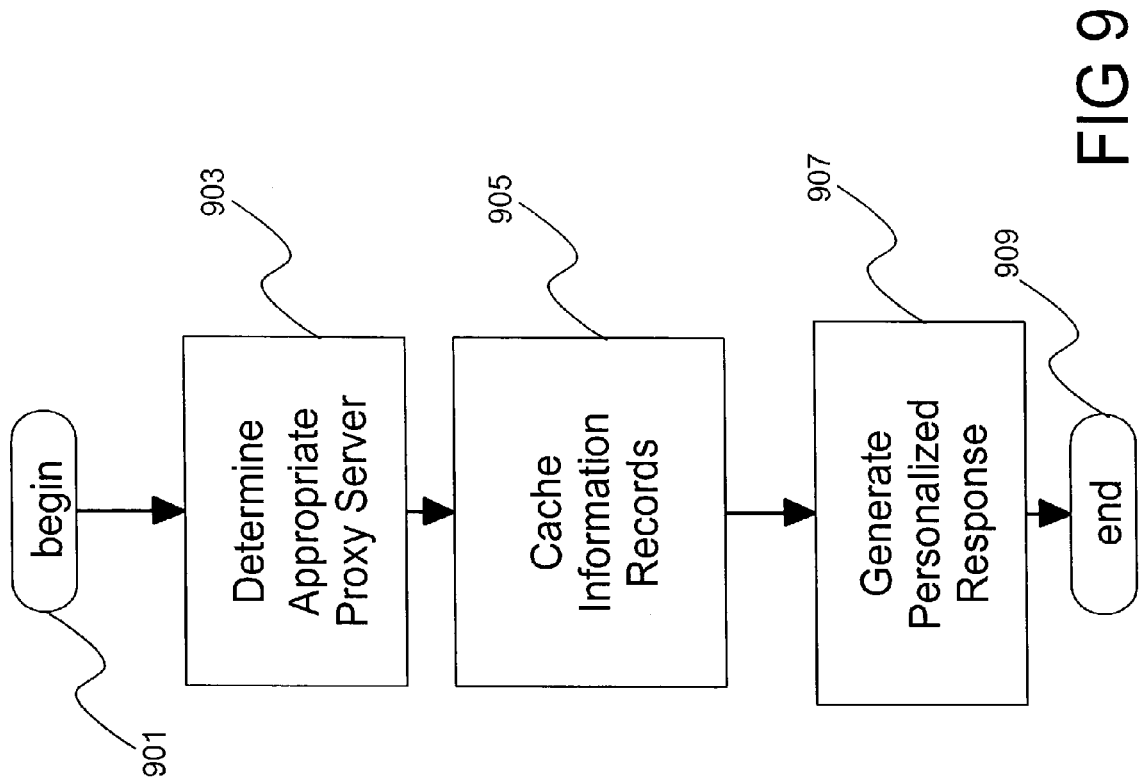
FIG. 9 is an example of a block diagram that shows steps that comprise a method of distributing the generation of personalized content for a particular user in accordance with the present invention.

FIG. 9 shows a sequence of operations that are executed in order to distribute the application of personalized content generation. A personalization operation provides a different version of content depending on the identity of the user accessing the content. As an example, two users may access the same Web site using identical URLs. However, the personalization application would know that the first user is interested in sports and would include current scores from recent sports events for that user in the Web page being displayed; and, for the second user, who is interested in stock market information, it would include the current value of leading stock market indices.

The process of personalization begins in step 901 when a user makes a request to access information from the system. In step 903, the system determines an appropriate proxy server at which the request ought to be executed. When the request is dispatched to the appropriate proxy server, in step 905 the proxy server caches a set of information records that are related to creating a personalized response to the request. Caching refers to the process by which the proxy server checks to see whether it has up-to-date copies of information records present locally, and if not, it obtains them from the origin server. The types of information records that need to be cached are described further in FIG. 10. After the caching step is completed, the system generates a personalized response to the query in step 907. In step 907, the response is also delivered to the client and the process terminates in step 909.

The information records maintained at the proxy site are divided into two types: a set of information records that contain user profiles, and another set of information records that contain templates on the basis of which personalized content is generated. A user profile contains the preferences and particulars of a specific user, or a group of users. Thus, a user profile may include details such as the fact that a user is interested in sports events or stock market events, whether he wants to read the pages in English or French, and other preferences of a similar nature.

It is to be noted that the user profiles may be maintained separately for each individual user, or on the basis of a group of users. When defined for a group of users, the user profile may be defined for all users originating from a specific group of IP addresses, a specific domain name, or users accessing a specific URL. The template information records contain information that details the different parts of a page that is to be served to the user. A sample template is often used to define that the page includes two tables placed side by side, with the first table including of statically defined information, while the second table contains a list of items that are generated depending on the user profile.

Figure 10:
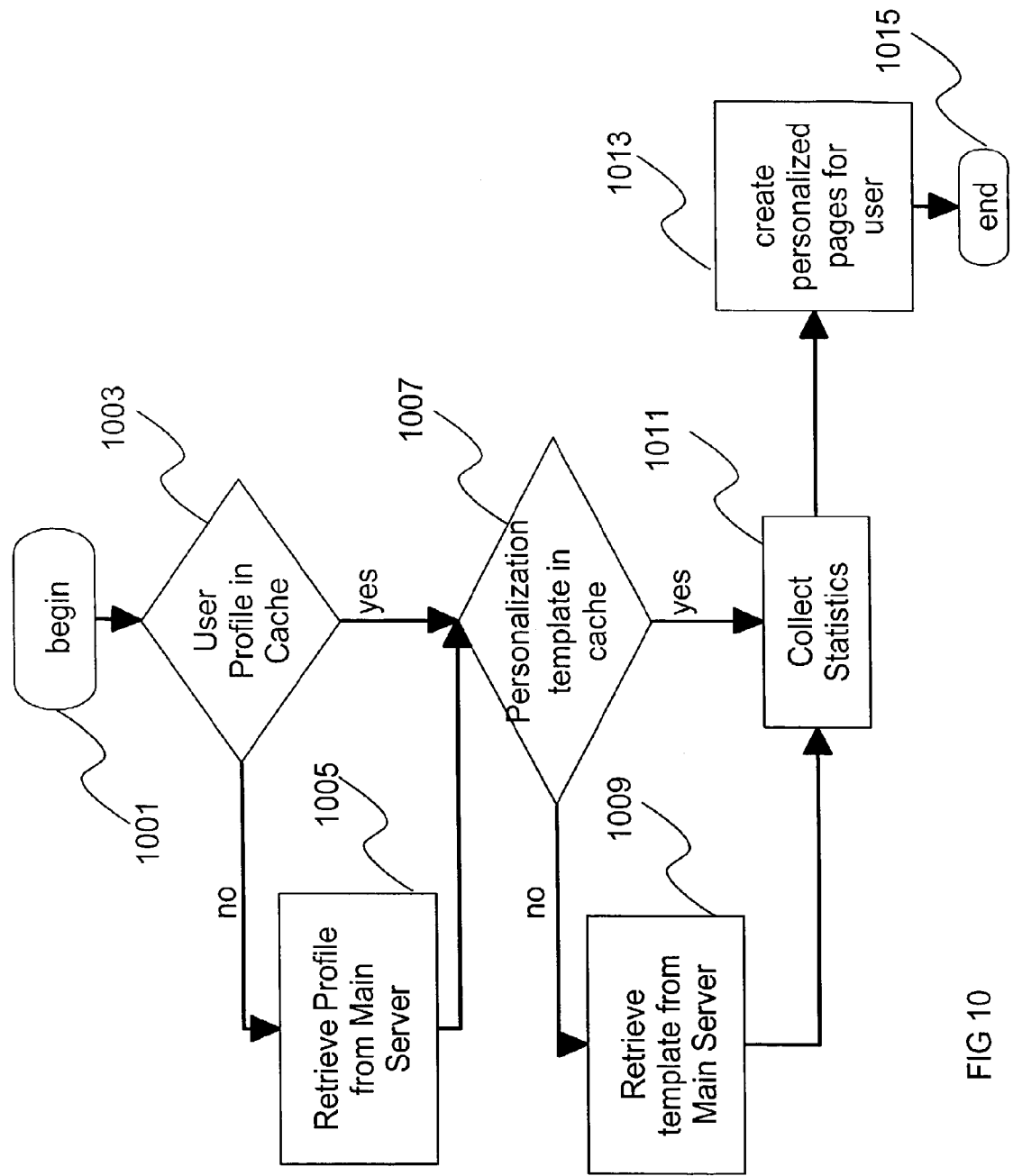
FIG. 10 is an example of a block diagram that shows steps that are taken by a proxy server in generating personalized content, in accordance with the present invention.

FIG. 10 illustrates an example of the steps taken by the proxy server in more detail. The proxy server begins at step 1001 of the algorithm illustrated in FIG. 10 when the request is received at the proxy site. In the next step 1003, the system determines the matching user profile that needs to be applied for this user, and checks to see if that user profile is in the cache of profiles maintained locally at the proxy server. The determination of the user profile may involve determining the group membership of the user, if the profiles are defined on the basis of groups of users. If the user profile is not found in the cache at the proxy site, or if the user profile found in the cache is not up-to-date, the proxy server retrieves it from the main server in step 1005. If the entry is found in the cache in step 1003, or after the completion of step 1005, the algorithm proceeds to step 1007. In step 1007, the algorithm determines if a template for the URL being accessed by the client is present in the cache. If not, the template is retrieved and cached in step 1009. After the completion of step 1009, or if the template is found in step 1007, the algorithm proceeds to step 1011. In step 1011, the algorithm collects statistics pertinent to the user's request. These statistics can be used to modify the profile of a user in subsequent requests. After the statistics are collected, the algorithm creates a personalized page for the user as per the template and profile in step 1013. The algorithm then terminates in step 1015. Those versed in the state of the art will realize that the order in which steps 1011 and 1013 are executed can be interchanged without a change to the basic algorithm.

Figure 11:
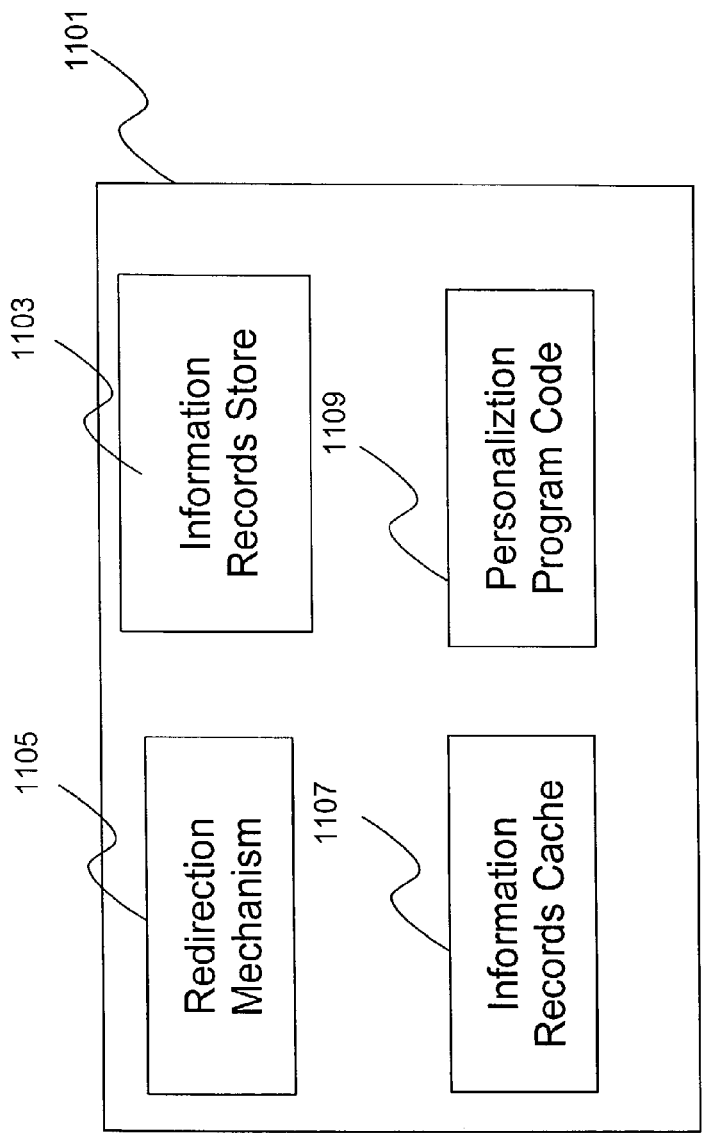
FIG. 11 is a block diagram showing an example of the structure of a distributed system that implements the proposed solution to the distributed personalized content generation problem.

An overall distributed system for distribution of personalized content is shown in FIG. 11. The entire apparatus, 1101, for distribution of personalized content generation includes four components: a redirection mechanism, 1105, an information records store, 1103, an information records cache, 1107, and the personalization program code, 1109. The redirection mechanism, 1105, includes means for directing users towards a specific proxy server in the system. The information records store, 1103, contains information records dealing with user profiles and templates, as well as statistics information. The information records store, 1103, would typically be present at the origin server as described in FIG. 1. At the different proxy servers, the set of information records would be cached in the form of the information records cache, 1107. The personalization program code, 1109, provides means by which the actual response to a user request is created.

Figure 12:
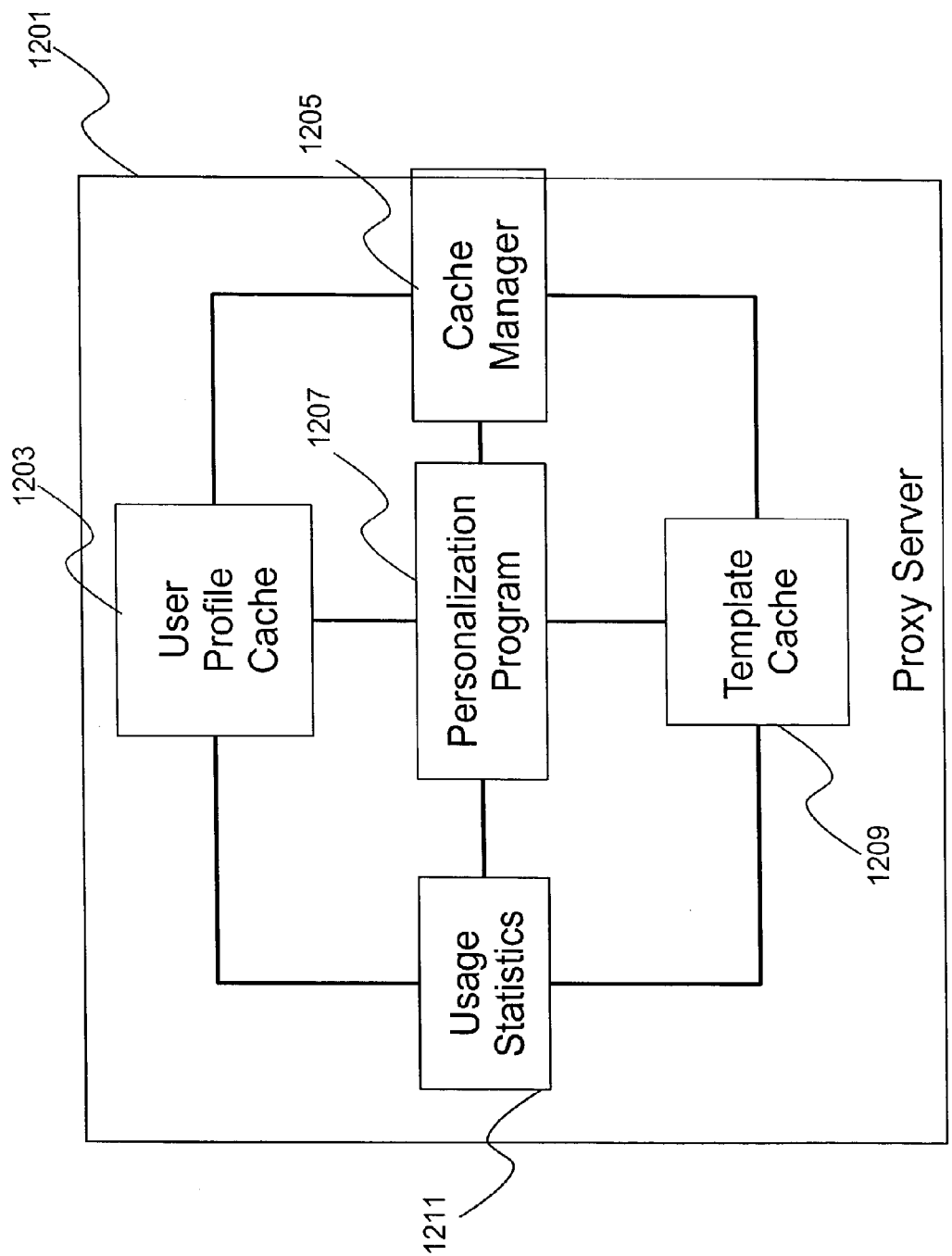
FIG. 12 is a block diagram showing an example of a structure of a proxy server, which is a component of a solution to the distributed personalized content generation problem in accordance with the present invention.
Figure 13:
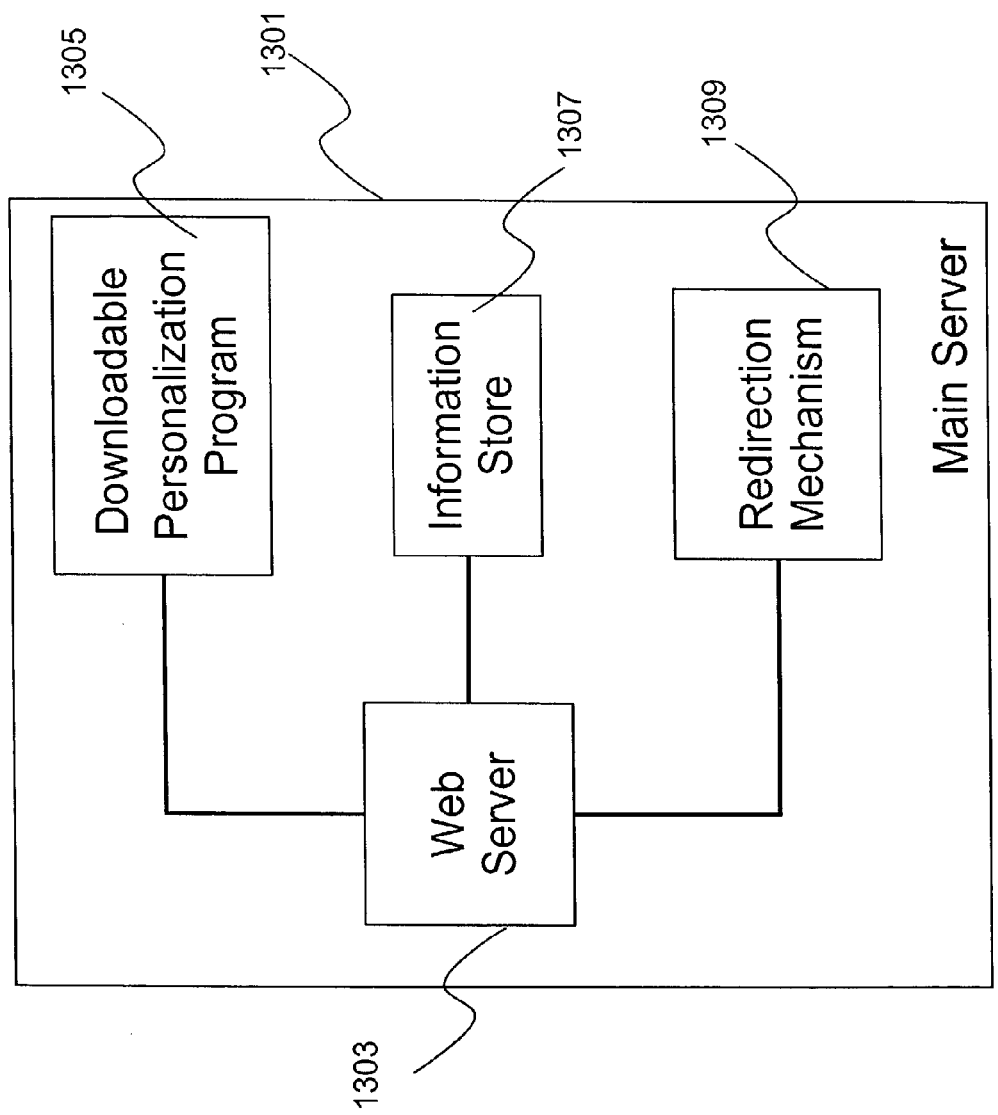
FIG. 13 is a block diagram showing an example of a structure of a main server, which is a component of a solution to the distributed personalized content generation problem in accordance with the present invention.

FIGS. 12 and 13 provide more details of an embodiment of a distributed system. The distributed system includes proxy servers and an origin server. The structure of the proxy server is described in FIG. 12, while the structure of the origin server is described in FIG. 13.

FIG. 12 shows one of several possible ways by which the proxy server required for distributing generation of personalized content can be implemented. The apparatus depicted in FIG. 12 shows the proxy server, 1201, which includes a user-profile cache, 1203, a template cache, 1209, a usage statistics component, 1211, a cache manager, 1205, and a personalization program, 1207. The personalization program, 1207, could be implemented as a servlet, a Java server page, or a cgi-bin script running behind a Web-server. The user profile cache, 1203, includes a cache of information records that contain user profiles. The template cache, 1209, contains a set of information records that contain information about the templates according to which content needs to be generated. The user profile cache, 1203, and the template cache, 1209, are managed and controlled by the cache manager, 1205. The cache manager 1205 is responsible for: checking if entries are present in the user profile cache, 1203, or the template cache, 1209; determining if they are up-to-date; and, retrieving them from the origin server if they are not found or are out-of-date.

FIG. 13 shows a structure of the origin server to implement an apparatus embodying this invention. The origin server, 1301, includes a Web-server, 1303, which implements the protocol processing required to communicate with the clients, and one or more proxy servers as described in FIG. 12. The Web-server, 1303, connects to a store containing a downloadable version of the personalization program code, 1305. The personalization program code, 1305, is provided to the proxies so that they can execute it as part of their personalization program, 1207. The Web-server also provides access to an information store, 1307. The information store maintains the original copies of the user profiles and templates that can be used for personalization at the proxy servers. In some embodiments, the Web-server may also connect to a redirection module, 1309, which determines where the different clients ought to be directed in order to accelerate the generation of personalized content. In other embodiments, the redirection module is implemented as a modified domain name server that can forward requests to the proxy server directly without the direct participation of the origin server.

Figure 14:
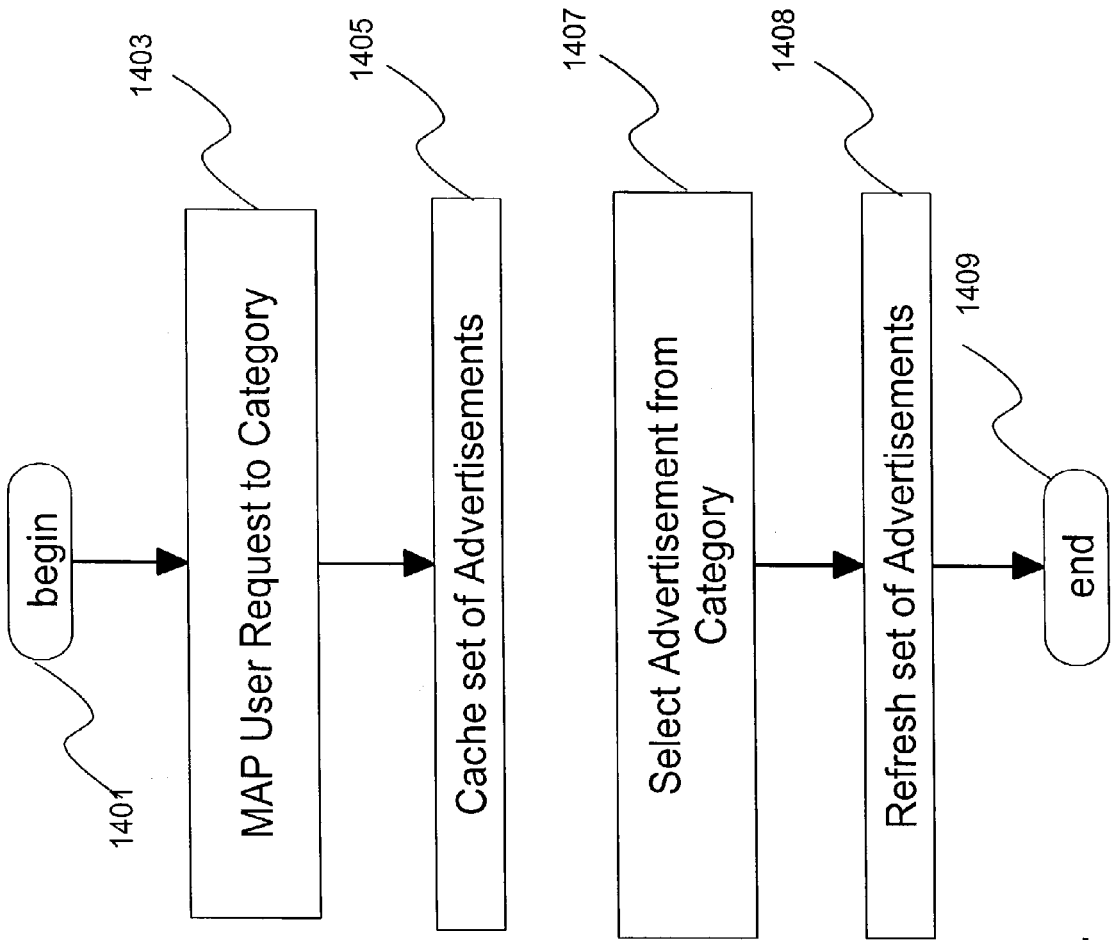
FIG. 14 is a block diagram that shows steps that comprise an example of a method of distributing generation of advertisements for a particular request.

FIG. 14 shows an example of a flowchart executed by a distributed system in order to accelerate the generation of advertisements as part of content shown to a user. Advertisements are usually created in selected areas of a Web page and are targeted to a local geography, or to a specific profile with which a user is associated. The generation of advertisements is confined to a central origin site in the current state of the art. Our invention enables advertisement generation to be created at multiple proxy servers that are located closer to the clients, thereby accelerating its performance, and resulting in higher scalability.

The flowchart shown in FIG. 14 is entered at the beginning step, 1401, when an advertisement needs to be generated, e.g., when a template space in a Web page needs to be filled by a generate advertisement operation. In the next step, 1403, the request is directed to one of the surrogate servers, or proxy servers, that are in the system. In step 1405, the proxy server receiving the request caches a set of advertisements at its location. The surrogate server then selects a category of advertisements, and chooses one advertisement that belongs to the said category in step 1407. In step 1408, the proxy server refreshes or changes the set of advertisements that it is currently caching so that new advertisements can be generated on subsequent requests. This step may be skipped if the proxy determines that there is no need for such a refreshing. The process then terminates in step 1409. By obtaining the set of advertisements from the origin site, and refreshing them periodically, the proxy server is able to generate advertisements from its locally cached data, thereby reducing the latency in advertisement generation perceived by the client.

Figure 15:
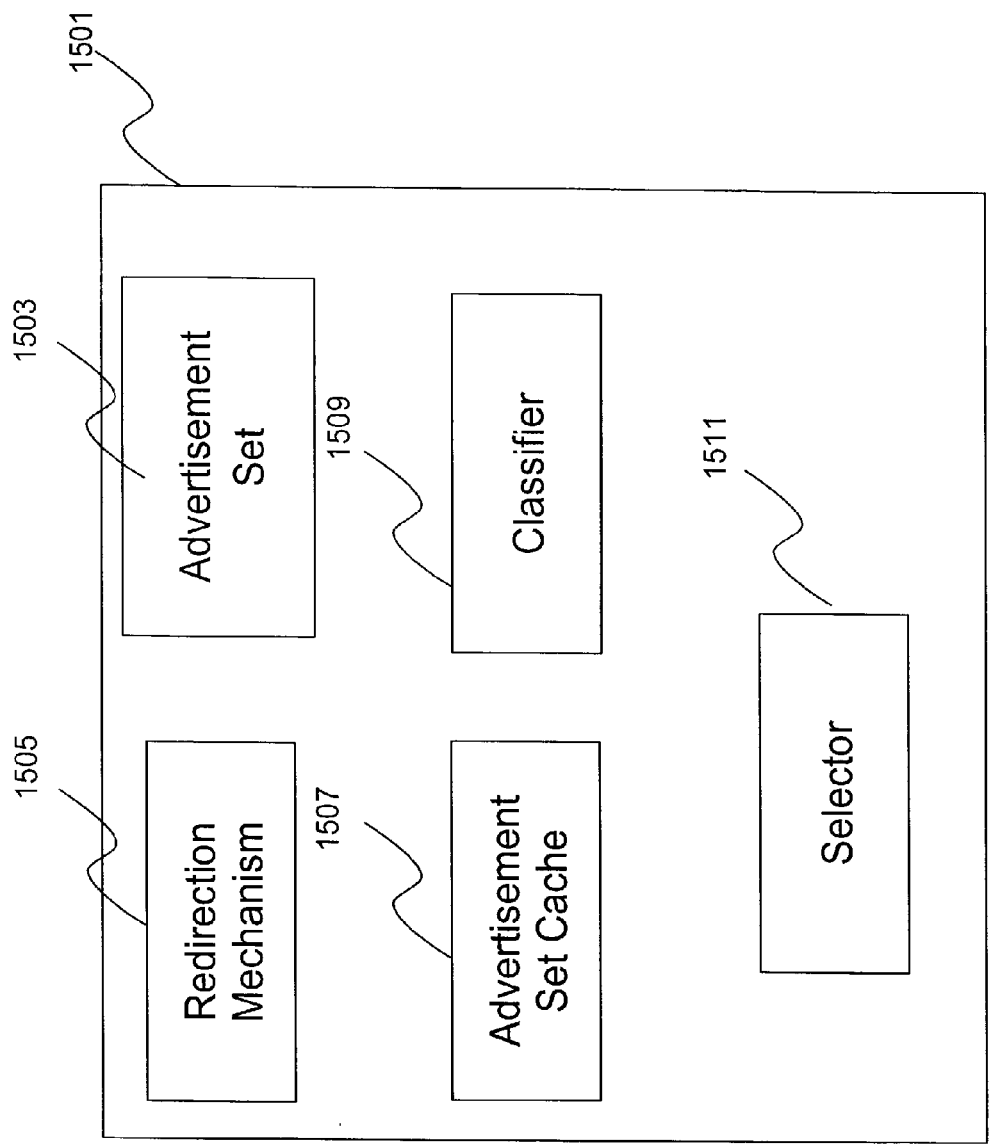
FIG. 15 is a block diagram showing an example of a structure of a distributed system that implements a solution to the distributed advertisement generation problem in accordance with the present invention; and, FIG. 16 is a block diagram showing an example of the structure of a proxy server in accordance with the present invention.

FIG. 15 shows an example of a structure of a distributed system used for generating advertisements in a distributed manner. The apparatus, 1501, includes a redirection mechanism, 1505, an advertisement set, 1503, an advertisement cache, 1507, a classifier, 1509, and a selector, 1511. The redirection mechanism, 1501, provides means by which requests are directed to different surrogate and proxy servers in the network. The advertisement set, 1505, includes the different advertisements that are to be generated in response to different requests, and is located at the origin server. The advertisement cache, 1507, is located at the proxy server, and acts to provide local access to advertisement generation program code. The classifier, 1509, and the selector, 1511, are instances of program code that are downloaded from the origin server and executed at the proxy server in the network.

The classifier program code, 1509, maps each user request into one of many categories. The set of all advertisements are divided into different categories, each category containing one or more advertisements. The set of all advertisements includes one or more advertisements. The selector program code, 1511, selects one of the advertisements randomly from the selected category and displays it to the user as part of its response.

When advertisements have to be generated in a specific manner, e.g., an advertisement has to be shown at a specific time, the selector module can be modified to select that particular advertisement more often. Similarly, the set of advertisements which are maintained in the cache at the proxy server can also be selected so as to prefer the selection of targeted advertisements.

Figure 16:
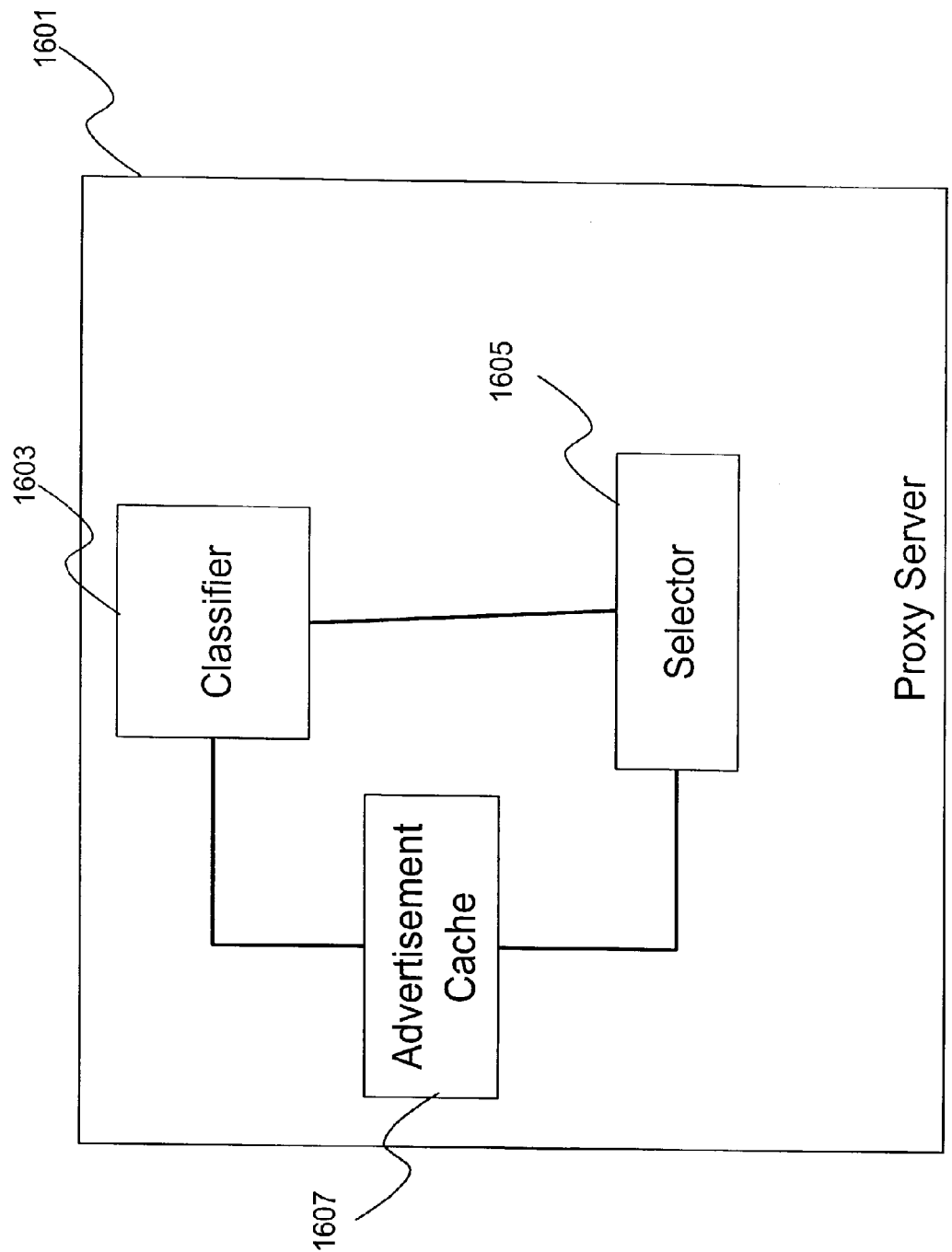

A structure of an apparatus at the proxy server used for generation of advertisements is shown in FIG. 16. The apparatus, 1601, includes an advertisement cache, 1607, a classifier, 1603, and a selector, 1605. The advertisement cache, 1607, provides a cached copy of the original advertisement which is located at the origin server. The classifier, 1603, and selector, 1605, are program codes that are downloaded from the origin server and executed at the proxy server. The proxy server executes the programs to select one of the advertisements from the cached copies. The advertisement cache, 1607, is periodically refreshed with advertisements from the origin site. In conjunction with the origin site, the proxy server provides a means for accelerating the performance of the process of generating advertisements.

Variations described for the present invention can be realized in any combination desirable for each particular application. Thus particular limitations, and/or embodiment alternatives and/or enhancements described herein, which may have particular advantages to the particular application, need not be used for all applications. Also, not all limitations need be implemented in methods, systems and/or apparatus including one or more concepts of the present invention.

It is noted that the present invention can be realized in hardware, software, or a combination of hardware and software. A tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which includes all the features enabling the implementation of the methods described herein, and which—when loaded in a computer system—is able to carry out these methods.

Computer program means or computer program in the present context means any expression, in any language, code or notation, of a set of instructions intended to cause a system having an information processing capability to perform a particular function either directly or after conversion to another language, code or notation, and/or reproduction in a different material form.

It is noted that the foregoing has outlined some of the more pertinent objects and embodiments of the present invention. Although the description is made for particular arrangements and methods, the intent and concept of the invention is suitable and applicable to other arrangements. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A non-transitory program storage device readable by machine, embodying a program of instructions executable by the machine to perform method steps for causing operation distribution of at least one networked application, comprising:

distributing at least one operation of at least one networked application;

directing at least one user request to at least one surrogate server;

caching a set of information records needed for said at least one operation at said at least one surrogate server;

executing said at least one operation at said at least one surrogate server using the set of information records, said at least one operation being at least an auction application and said at least one surrogate server being a current auction site;

determining periodically whether migration of the current auction site to a different surrogate server is needed based on periodically re-computed data associated with one or more surrogate servers;

determining a second surrogate server as a new auction site;

sending a message to the second surrogate server requesting permission to host a current auction, the message further including information associated with the current auction; and transferring one or more new user requests for the current auction to the new auction site.

2. The non-transitory program storage device of claim 1, wherein at least one of the origin server is a Web-server.

3. The non-transitory program storage device of claim 1, further including:

receiving at least one service request from a user;

determining an appropriate proxy server to which to direct said at least one service request;

caching a set of information records to the appropriate proxy server; and personalizing a response provided to the user at the appropriate proxy server using said information records.

4. The non-transitory program storage device of claim 3, including at least one limitation taken from a group of limitations consisting of:

wherein the step of caching a set of information records comprises caching a set of user profiles at the proxy server;

wherein the step of caching a set of information records includes at least one of caching a set of category records at the proxy server; and caching a set of templates at the proxy server;

wherein the method further comprises the steps of:
collecting statistics on URLs accessed by the user, sending the statistics to a server, and changing a category of the user on the basis of the statistics;
wherein the step of caching includes periodically refreshing a cache of templates from the origin server;
wherein the step of distributing at least one personalization operation includes personalizing server-based content;
wherein server-based content is Web content;
wherein the step of determining an appropriate proxy server includes employing information related to the user;
wherein the step of personalizing comprises at least one step taken from a group of steps consisting of: locating a specific user profile for the user, determining a specific category on the basis of the specific user profile, selecting the template for a URL accessed by the user, and generating a response for the user using the template and the category;
wherein the step of caching includes periodically refreshing a cache of user profiles from a server; or
any combination of these limitations.

5. The non-transitory program storage device of claim 1, further comprising:
receiving at least a portion of an advertisement application from an origin server, while maintaining communication with the origin server to send one or more results of executing the advertisement application;
mapping a user request to a category of advertisement types;
caching a set of advertisements;
selecting said at least one advertisement corresponding to the category from the set; and
refreshing the set of advertisements.

6. The non-transitory program storage device of claim 5, including at least one limitation taken from a group of limitations consisting of:
wherein the step of caching a set of information records comprises caching a set of user profiles at the proxy server;
wherein the step of caching a set of information records includes at least one of caching a set of category records at the proxy server; and
caching a set of templates at the proxy server;
wherein the method further comprises the steps of:
collecting statistics on URLs accessed by the user, sending the statistics to a server, and changing a category of the user on the basis of the statistics;
wherein the step of caching includes periodically refreshing a cache of templates from the origin server;
wherein the step of distributing at least one personalization operation includes personalizing server-based content;
wherein server-based content is Web content;
wherein the step of determining an appropriate proxy server includes employing information related to the user;
wherein the step of personalizing comprises at least one step taken from a group of steps consisting of: locating a specific user profile for the user, determining a specific category on the basis of the specific user profile, selecting the template for a URL accessed by the user, and generating a response for the user using the template and the category;
wherein the step of caching includes periodically refreshing a cache of user profiles from a server; or
any combination of these limitations.

7. The non-transitory program storage device of claim 1, further including:
refreshing the set of information records from an origin server.

8. The non-transitory program storage device of claim 1, wherein said at least one operation is one or more of: processing an auction of an item; a personalization operation; or generating advertisements for a client; or combinations thereof.

9. The non-transitory program storage device of claim 1, including a step inclusion selected from a group of step inclusions consisting of:
the step of directing includes receiving a plurality of service requests related to a specific auction item, and determining an appropriate server to which to direct the service requests related to the specific auction item, and migrating an auction state for the specific auction item to the appropriate server;
the step of directing includes receiving at least one service request from a user, and determining an appropriate proxy server to which to direct said at least one service request;
the step of executing includes personalizing a response provided to the user at the appropriate proxy server using said information records;
the step of caching includes caching a set of advertisements;
the step of executing includes mapping a user request to a category of advertisement types, and selecting said at least one advertisement corresponding to the category from the set; or
any combination of these step inclusions.

10. A non-transitory program storage device readable by machine, embodying a program of instructions executable by the machine to perform method steps for auction distribution comprising:
receiving a plurality of service requests related to a specific auction item;
determining an appropriate server to which to direct the service requests related to the specific auction item;
distributing at least a portion of an auction application to the appropriate server, while maintaining communication with the appropriate server to receive one or more results of executing the auction application from the appropriate server and to exercise administrative control over said at least a portion of an auction application;
executing the auction at the appropriate server, the appropriate server being a current auction site;
determining periodically whether migration of the current auction site to a different surrogate server is needed based on periodically recomputed data associated with one or more surrogate servers;
determining a second surrogate server as a new auction site;
sending a message to the second surrogate server requesting permission to host a current auction, the message further including information associated with the current auction; and
transferring one or more new user requests for the current auction to the new auction site.

11. The non-transitory program storage device of claim 10, comprising a limitation selected from a group of limitations consisting of:
wherein the step of executing includes responding to at least one of the user service requests;
wherein the step of executing includes: obtaining and recording information regarding location of requesters for the item, and constructing a request log which includes a timestamped record of at least some pertinent information for at least one of said service requests related to the specific auction item;

wherein the step of responding includes returning auction results to at least one requester of said service requests related to the specific auction item;

wherein the step of determining includes collecting information about the distribution of requesters;

wherein the step of determining includes computing a migration weight related to the specific auction item for at least one proxy server and a main server, and selecting a particular proxy server having a highest weight as the appropriate server;

wherein the migration weight is determined by a distance to a zone having a largest number of requesters for a specific auction item;

wherein the migration weight is determined by a relative load of a proxy server;

wherein the step of determining includes initiating migration of the auction for the item;

wherein the step of migrating includes sending a message to the appropriate server informing the appropriate server of an intent to migrate the auction state, receiving a positive acknowledgement from the appropriate server, and forwarding subsequent requests for said auction item to the appropriate server;

wherein the auction state includes at least one auction parameter;

wherein the auction parameter includes a parameter from a group of parameters consisting of: an item description, a log of existing bids, a minimum criterion, or a combination of these;

wherein the step of forwarding employs an HTTP redirect mechanism;

wherein the method further comprises repeating the steps of determining and migrating in accordance with a redetermination criterion;

wherein the method further comprises logging at least a portion of at least one of said service requests related to the specific auction item; or any combination of these limitations.

12. An apparatus comprising:
a processor;
an origin server including a set of information records related to at least one user and a redirection mechanism to send a request from said at least one user to a proxy server and to distribute at least one operation of at least one networked application; and
at least one proxy server including a cache of information records needed for said at least one operation, said at least one proxy server executing said at least one operation using the information records, said at least one operation being at least an auction application and said at least one proxy server being a current auction site;
said origin server or said at least one proxy server or both, operable to determine periodically whether migration of the current auction site to a different proxy server is needed based on periodically re-computed data associated with one or more proxy servers,
said origin server or said at least one proxy server or both further operable to determine a second proxy server as a new auction site, and to send a message to the second surrogate server requesting permission to host a current auction the message further including information associated with the current auction,
said origin server or said at least one proxy server or both, further operable to transfer one or more new user requests for the current auction to the new auction site.

13. An apparatus as in claim 12, wherein the origin server and the proxy server are Web servers.

14. An apparatus comprising:
a processor;
an origin server comprising a copy of at least one advertisement to be displayed to a user; and
at least one proxy server including:
at least a portion of an auction application, said at least one proxy server operable to maintain communication with the origin server to send one or more results of executing the auction application to the origin server;
a classifier module to map a user request into a category of advertisement types;
a cache of advertisements for said category, said cache being refreshed from the copy at the origin server;
a selector module for selecting an advertisement from the cache and including it in the response to the user, in order to distribute a generation process of said at least one advertisement; and
an auction migrator module distributed on each proxy server operable to initiate migrating a current auction to a different proxy server and redirect one or more user requests for the current auction to the different proxy server.

* * * * *